US009982604B2

(12) United States Patent
Miller et al.

(10) Patent No.: US 9,982,604 B2
(45) Date of Patent: May 29, 2018

(54) MULTI-STAGE INTER SHAFT RING SEAL

(71) Applicant: United Technologies Corporation, Hartford, CT (US)

(72) Inventors: Jonathan L. Miller, Ware, MA (US); Antonio F. Artiles, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 86 days.

(21) Appl. No.: 14/601,057

(22) Filed: Jan. 20, 2015

(65) Prior Publication Data

US 2016/0208710 A1    Jul. 21, 2016

(51) Int. Cl.
*F16J 15/44* (2006.01)
*F02C 7/28* (2006.01)
*F01D 11/00* (2006.01)
*F16J 15/16* (2006.01)
*F01D 25/18* (2006.01)

(52) U.S. Cl.
CPC ............. *F02C 7/28* (2013.01); *F01D 11/003* (2013.01); *F01D 25/183* (2013.01); *F16J 15/16* (2013.01); *F16J 15/441* (2013.01); *F16J 15/442* (2013.01); *F05D 2250/182* (2013.01); *F05D 2250/294* (2013.01)

(58) Field of Classification Search
CPC ...... F16J 15/3484; F16J 15/441; F01D 11/00; F01D 11/003; F05D 2240/55; F02C 7/28
See application file for complete search history.

(56) References Cited

U.S. PATENT DOCUMENTS

| 1,544,609 | A | * | 7/1925 | Somes | F01D 11/003 |
| | | | | | 277/363 |
| 2,379,868 | A | | 7/1945 | Curtis | |
| 2,867,458 | A | | 1/1959 | Kroekel | |
| 2,921,805 | A | * | 1/1960 | Shevchenko | F16J 15/006 |
| | | | | | 277/365 |
| 3,119,623 | A | | 1/1964 | Shevchenko | |
| 3,189,357 | A | | 6/1965 | Talamonti | |
| 3,271,037 | A | | 9/1966 | Hammond | |
| 3,594,010 | A | * | 7/1971 | Warth | F16J 15/441 |
| | | | | | 277/413 |
| 4,380,905 | A | | 4/1983 | Smart et al. | |
| 4,415,165 | A | | 11/1983 | Martini | |
| 4,754,984 | A | | 7/1988 | Keba | |
| 4,783,179 | A | | 11/1988 | Katayama et al. | |
| 5,039,115 | A | * | 8/1991 | Hebert | F01D 11/00 |
| | | | | | 277/347 |
| 5,279,127 | A | | 1/1994 | Napoli | |

(Continued)

OTHER PUBLICATIONS

U.S. Appl. No. 13/626,511 Office Action dated Dec. 18, 2014.
(Continued)

*Primary Examiner* — Nicholas L Foster
(74) *Attorney, Agent, or Firm* — O'Shea Getz P.C.

(57) ABSTRACT

Aspects of the disclosure are directed to a system comprising: a first seal that includes a notch configured to avoid an adjacent seal plate radius edge and a first protrusion, and a second seal that is notch-free with respect to an inner diameter sealing face and includes a second protrusion, wherein the first protrusion and the second protrusion are configured to at least partially overlap with one another in at least one of an axial direction or a radial direction with respect to an engine centerline.

13 Claims, 15 Drawing Sheets

(56) References Cited

U.S. PATENT DOCUMENTS

| | | | |
|---|---|---|---|
| 5,518,256 | A | 5/1996 | Gaffal |
| 6,125,627 | A | 10/2000 | Rice et al. |
| 6,132,168 | A * | 10/2000 | Kovaleski ............. F01D 11/001 415/107 |
| 7,687,928 | B2 | 3/2010 | Taneja |
| 2005/0206088 | A1* | 9/2005 | Anderson ............... F01D 25/16 277/500 |
| 2007/0096398 | A1 | 5/2007 | Miller |
| 2007/0096399 | A1 | 5/2007 | Miller |
| 2008/0256922 | A1 | 10/2008 | Parkman et al. |
| 2009/0266080 | A1 | 10/2009 | Pieussergues et al. |
| 2010/0192578 | A1 | 8/2010 | Singh et al. |
| 2015/0132116 | A1* | 5/2015 | Zheng .................. F16J 15/3436 415/171.1 |

OTHER PUBLICATIONS

U.S. Appl. No. 13/716,774 Office Action dated Dec. 17, 2014.

L.P. Ludwig, "Sealing Technology for Aircraft Gas Turbine Engines", NASA Lewis Research Center, NASA Technical Memorandum NASA TM X-71607, Cleveland, Ohio, Technical Paper proposed for presentation at Tenth Propulsion Conference sponsored by the American Institute of Aeronautics and Astronautics and Society of Automotive Engineers in San Diego, California, Oct. 21-24, 1974.

Bruce M. Steinetz, "Engine Seal Technology Requirements to Meet NASA's Advanced Subsonic Technology Program Goals", NASA Technical Memorandum 106582 AIAA-94/2698, Prepared for the 30th Joint Propulsion Conference cosponsored by the AIAA, ASME, SAE, and ASEE, Indianapolis, Indiana, Jun. 27-29, 1994.

Robert C. Bill, "Wear of Seal Materials Used in Aircraft Propulsion Systems", Elsevier Sequoia S.A., Lausanne, Wear 59 (1980) 165-189, Printed in the Netherlands, presented at the Workshop on Thermal Deformation, Annapolis, Maryland, Jun. 1979.

Robert C. Hendricks, "Turbomachine Interface Sealing", NASA Technical Memorandum 2005-213633, Apr. 2005.

Extended EP Search Report dated May 31, 2016.

\* cited by examiner

MULTI-STAGE INTER SHAFT RING SEAL

BACKGROUND

Advanced, high-performance engines will require improved performance main shaft bearing compartment seals while also being required to meet more aggressive cost, weight, size, and reliability metrics. Improved capability main shaft bearing compartment carbon seals are needed to meet the increased demands of next generation high-performance engines. Carbon seals enable an engine and bearing compartment to function with minimal impact on Thrust Specific Fuel Consumption (TSFC), a thermal management system (TMS), and a lubrication system. Current and future engines require seals capable of providing wear resistance, improved performance and improved reliability.

Referring to FIG. 1A, an environment is depicted of a system that may be applied in connection with a bearing compartment 101 of an engine. In FIG. 1A there are six ring seal stages, denoted as stages 1 through 6, arranged about an engine centerline 102. A pair of adjacent ring seal stages (e.g., stages 1 and 2) are bounded on either side by a pair of plates (e.g., plates 104 and 106) and a liner 108 located radially outward from the engine centerline 102. Also associated with the environment of FIG. 1A are two rotors; a so-called high rotor 110 and a low rotor 112. The two rotors 110 and 112 may rotate in the same direction or in opposite directions, with the same speed or with different speeds. Aspects of this disclosure are not limited to a co-rotating environment; for example, aspects of the disclosure may be applied in connection with a rotating structure arranged about a fixed/stationary structure.

FIG. 1B illustrates a pairing of any two adjacent stages (e.g., stages 1 and 2, or stages 3 and 4, or stages 5 and 6) of FIG. 1A. Between the two stages shown in FIG. 1B exists a cavity 152 for accommodating a retaining spring which loads these stages against the aforementioned plates (e.g., plates 104 and 106), causing contact pressure against them. Stages 1, 3 and 5 may contain higher levels of axial force, contact pressure and PV (contact pressure (P) multiplied by rubbing velocity (V)) levels compared to stages 2, 4 and 6. This is due to the additional air pressure loading imparted onto stages 1, 3 and 5. Stages 2, 4 and 6 also contain air pressure loading, however this pressure acts in the opposite direction so as to reduce the overall axial force, contact pressure and PV.

The existing design of the six carbon ring elements contains a relief cut notch (e.g., notches 155 and 156—see FIG. 1B) on the inner diameter (ID) sealing face, which was set to avoid the adjacent seal plate radius edge (e.g., edge 132 of FIG. 1A) with radial eccentric overhang and a potential to cause a wear step in the carbon element. The need to avoid the seal plate radius edge only applies to stages 2, 4 and 6; however, the carbon element relief cut notch (e.g., notch 155 or notch 156) is provided on all 6 carbon ring stages 1-6 to maintain proper "fool-proofing" (e.g., to avoid improper assembly/installation). It may be possible to remove this relief cut notch (e.g., 155) on stages 1, 3 and 5 since these particular stages do not require it, as the adjacent seal plate geometry does not contain a radius edge. However, such an approach makes the two stages in each pair different from each other, raising concerns for fool-proofing and the possibility that the incorrect ring would be placed in the incorrect location, potentially causing premature carbon ring wear and failure.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a first seal that includes a notch configured to avoid an adjacent seal plate radius edge and a first protrusion, and a second seal that is notch-free with respect to an inner diameter sealing face and includes a second protrusion, wherein the first protrusion and the second protrusion are configured to at least partially overlap with one another in at least one of an axial direction or a radial direction with respect to an engine centerline. In some embodiments, the first protrusion and the second protrusion are configured to at least partially overlap with one another in the axial direction and the radial direction. In some embodiments, the system further comprises a spring located in a cavity formed between the first seal and the second seal. In some embodiments, the first seal and the second seal are configured to provide an axial gap to accommodate a compression of the spring and a movement of the first seal and the second seal. In some embodiments, the spring is a wave spring. In some embodiments, the first seal and the second seal are configured to provide a radial gap that accommodates a movement of the first seal and the second seal. In some embodiments, the first seal and the second seal are configured to provide a radius that accommodates a minimization in teams of stress. In some embodiments, the first seal and the second seal are configured to be bound by a first plate and a second plate. In some embodiments, the system further comprises a bearing compartment coupled to the first seal and the second seal. In some embodiments, the first seal and the second seal are configured to be arranged about a first rotor and a second rotor. In some embodiments, the first rotor rotates at a first speed and the second rotator rotates at a second speed that is different from the first speed. In some embodiments, the first seal and the second seal are configured to be arranged about a first structure that rotates and a second structure that is stationary. In some embodiments, the first protrusion and the second protrusion are configured such that if improperly assembled, the resulting assembly will require more axial space than is available between the plates, therefore providing assembly fool-proofing with respect to an orientation of the first seal and the second seal.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
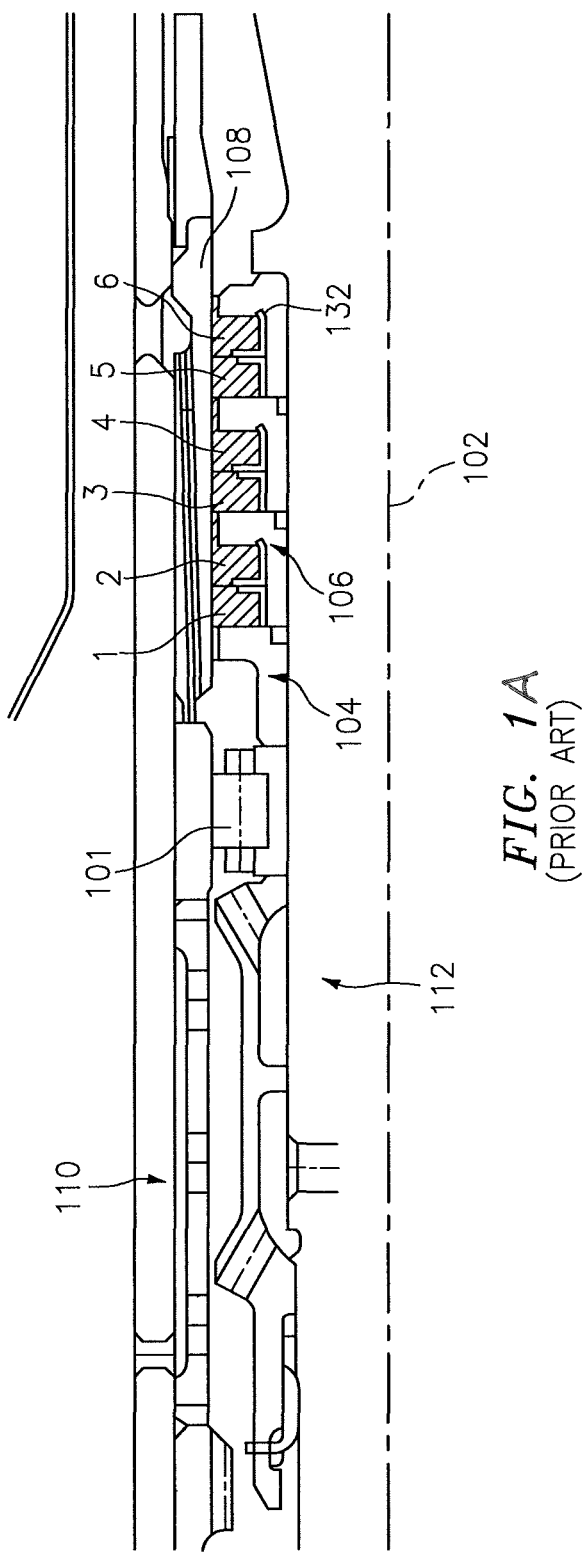
FIG. 1A illustrates a system associated with a bearing compartment of an engine incorporating an arrangement of pairs of seals in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a multi-stage inter shaft ring seal with additional "fool-proofing" measures (e.g., measure that prevent an improper assembly/installation) that enable contact pressure and PV (contact pressure multiplied by rubbing velocity) reduction on one or more stages, such as stages 1, 3, and 5. A ring seal geometry may contain/provide fool-proofing and overlapping "legs" that replace flat surfaces. These legs may meet one or more requirements, such as fool-proofing, gapping or physical space/geometry constraints, as well as meet all other ring seal application design requirements. The ring seal design will then also remove the inner diameter (ID) relief cut notch on stages 1, 3, and 5 as these stages may be unique compared to stages 2, 4, and 6. Stages 1, 3 and 5 may not require this notch because the adjacent seal plate geometry might not contain a radius edge to avoid radial eccentric overhang and a potential wear step. Stages 2, 4, and 6 may maintain the needed, proper ID relief cut notch. Accordingly, aspects of the disclosure may provide additional surface area and a resulting contact pressure/PV reduction on stages 1, 3, and 5 to mitigate carbon ring wear and failure.

Figure 2:
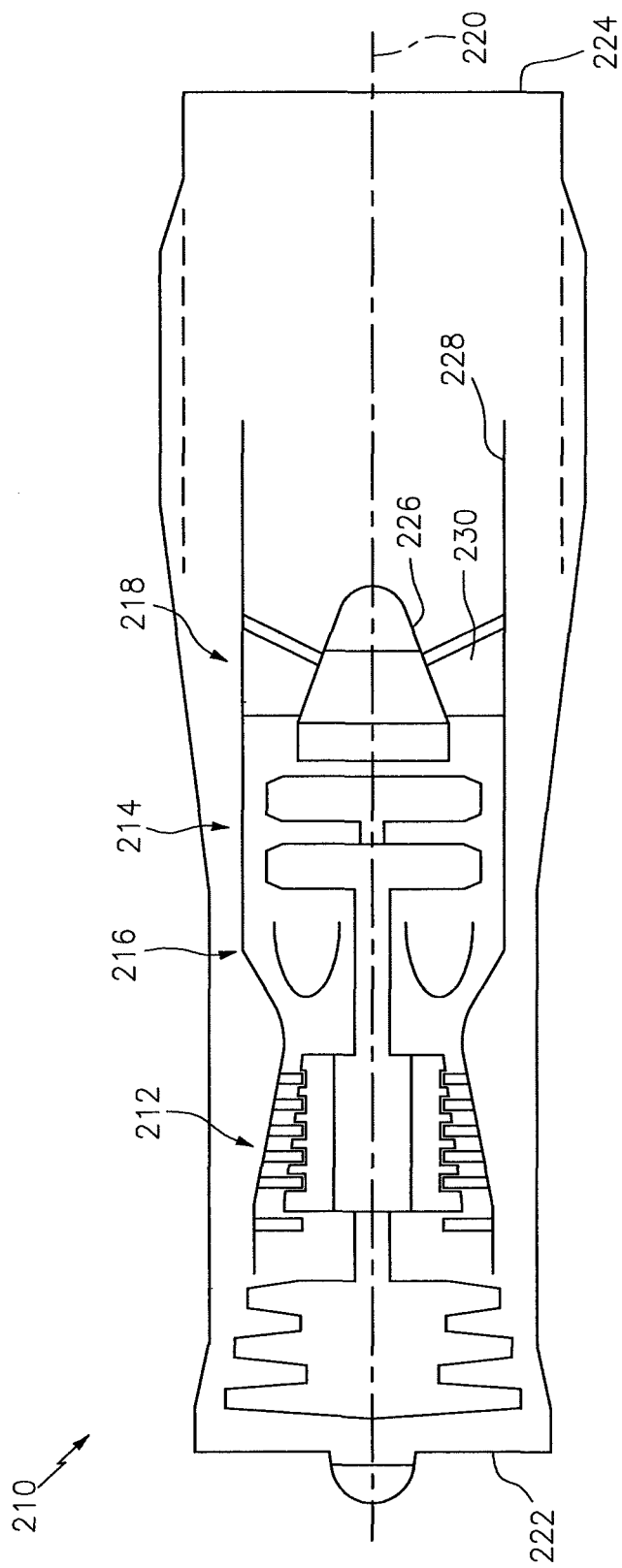
FIG. 2 illustrates an exemplary gas turbine engine in accordance with aspects of this disclosure.

Aspects of the disclosure may be applied in connection with an aircraft, or portion thereof. For example, aspects of the disclosure may be applied in connection with a gas turbine engine. FIG. 2 is a side-sectional illustration of an exemplary gas turbine engine 210. The engine 210 includes a compressor section 212, a turbine section 214 and one or more engine hot sections. The engine hot sections may include, for example, a first engine hot section 216 configured as a combustor section and a second engine hot section 218 configured as an augmentor section. The compressor section 212, the first engine hot section 216, the turbine section 214 and the second engine hot section 218 may be sequentially aligned along an axial centerline 220 between a forward engine airflow inlet 222 and an aft engine airflow exhaust 224. The second engine hot section 218 may include a first (e.g., annular, radial inner) duct case 226, a second (e.g., annular, radial outer) duct case 228, and one or more hot section vanes 230.

The engine 210 is illustrative. Aspects of the disclosure may be applied in connection with other engine types or configurations.

Figure 3:
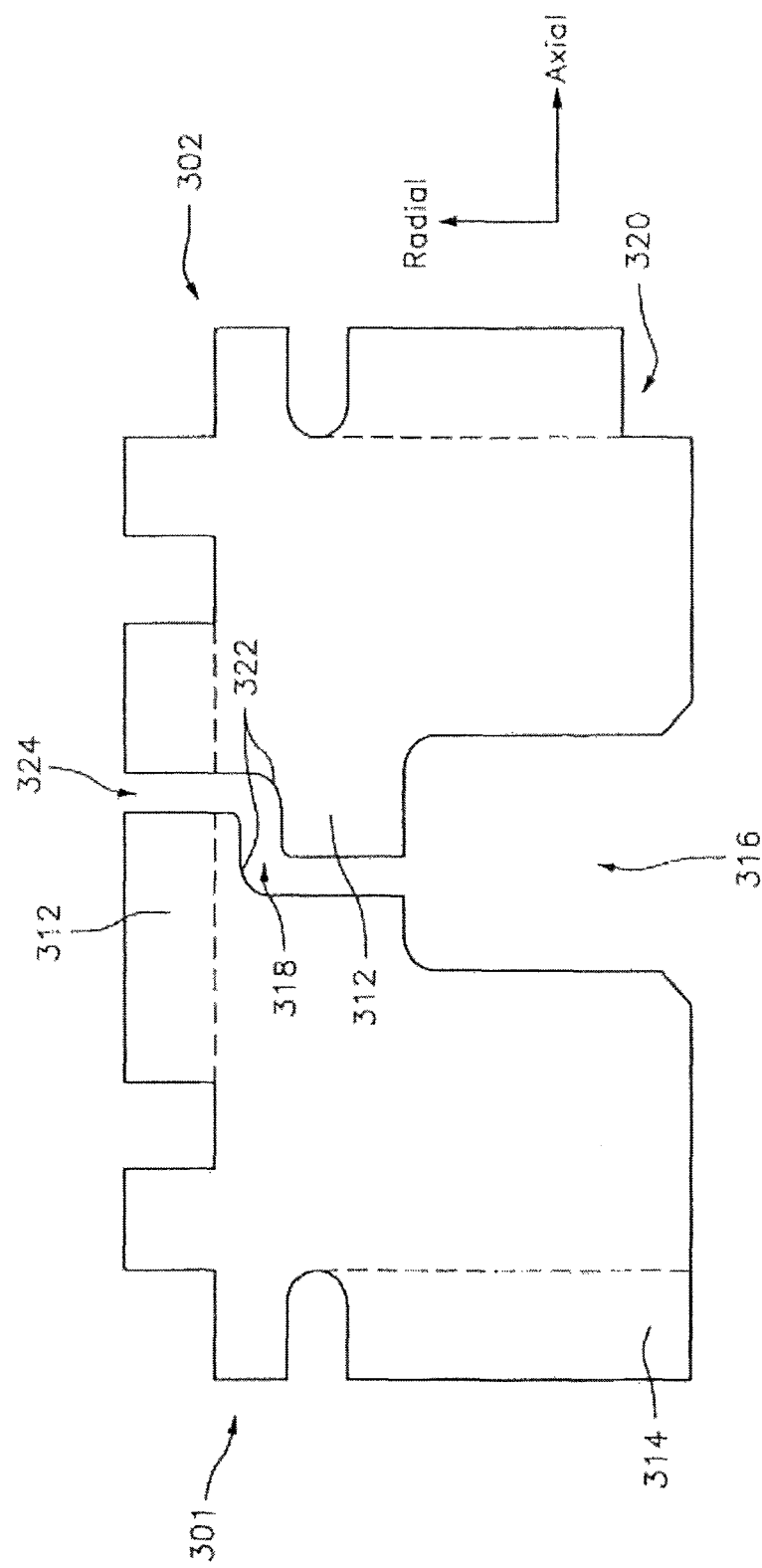
FIG. 3 illustrates a pair of adjacent seals in accordance with aspects of this disclosure.

Referring to FIG. 3, a pair of seals in accordance with this disclosure are shown. A first of the seals is labeled with a reference character 301, and a second of the seals is labeled with a reference character 302. The seals 301 and 302 could serve as a substitute or replacement for one or more of the seals of FIGS. 1A-1B. For example, one or more of the seal 301 could be used to replace one or more of the seals 1, 3, and 5, and one or more of the seal 302 could be used to replace one or more of the seals 2, 4, and 6.

The seals 301 and 302 may include a number of distinguishing features which are denoted in FIG. 3 via reference characters 312-324. These features/reference characters 312-324 are described in further detail below.

The reference character 312 refers to fool-proofing geometry "legs" or protrusions within a carbon ring seal design. The legs/protrusions 312 at least partially overlap with one another in at least one of an axial direction or a radial direction (with respect to an engine centerline (e.g., centerline 20 of FIG. 2)). While the leg 312 associated with the seal 301 is shown as being of a greater size/dimension relative to the leg 312 associated with the seal 302, it is understood that they may be the same size/dimension or that the leg 312 associated with the seal 302 may be greater than the leg 312 associated with the seal 301 in terms of size/dimension. Furthermore, in some embodiments, the relative position of the legs 312 with respect to the seals 301 and 302 may be inverted relative to what is shown in FIG. 3.

The reference character 314 refers to fool-proofing (e.g., fool-proofing associated with the legs/protrusions 312 overlapping with one another) enabling a removal of an ID notch on stages 1, 3, and 5 (e.g., the notch 155 of FIG. 1B), and a provisioning of additional contact area for PV and contact pressure reduction. In this respect, the seal 301 may be referred to as being notch-free with respect to the ID sealing face.

The reference character 316 refers to a cavity for accommodating a spring 317, e.g., a wave spring. The cavity 316 may be established to provide for spring optimization and may be selected based on prior use/experience. The cavity 316 may correspond to the cavity 152 of FIG. 1B.

The reference character 318 refers to a radial gap that is selected to accommodate/allow a degree of carbon movement and avoid an interference with the radius.

Figure 1B:
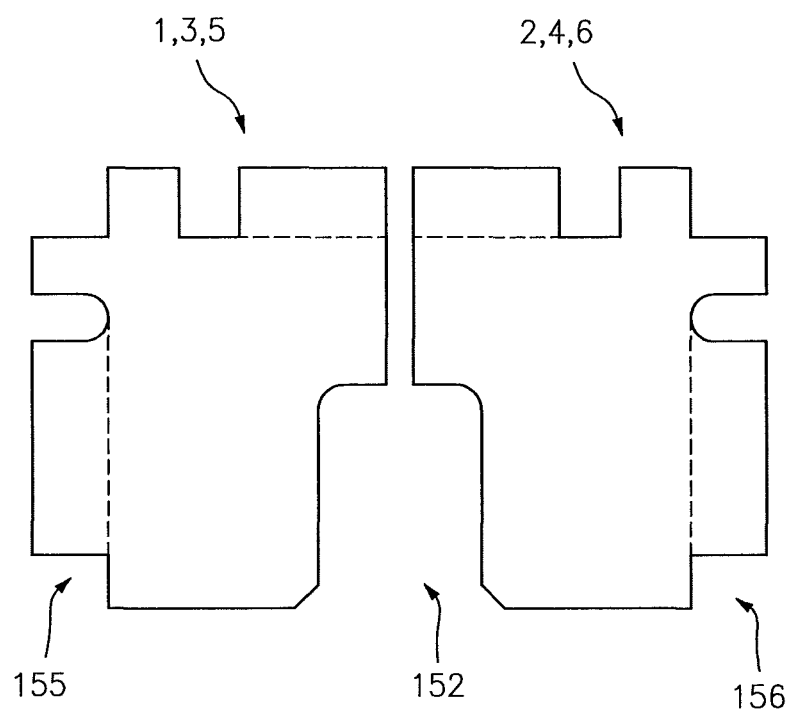
FIG. 1B illustrates a pair of adjacent seals from FIG. 1A in accordance with the prior art.

The reference character 320 refers to a notch for avoiding an adjacent seal plate radius edge while providing radial eccentricity, and may correspond to the notch 156 of FIG. 1B.

The reference character 322 refers to a radius that is provided to accommodate a minimization/reduction in stress.

The reference character 324 refers to axial gaps that are set/selected for allowing/enabling spring compression and carbon movement.

Figure 3A:
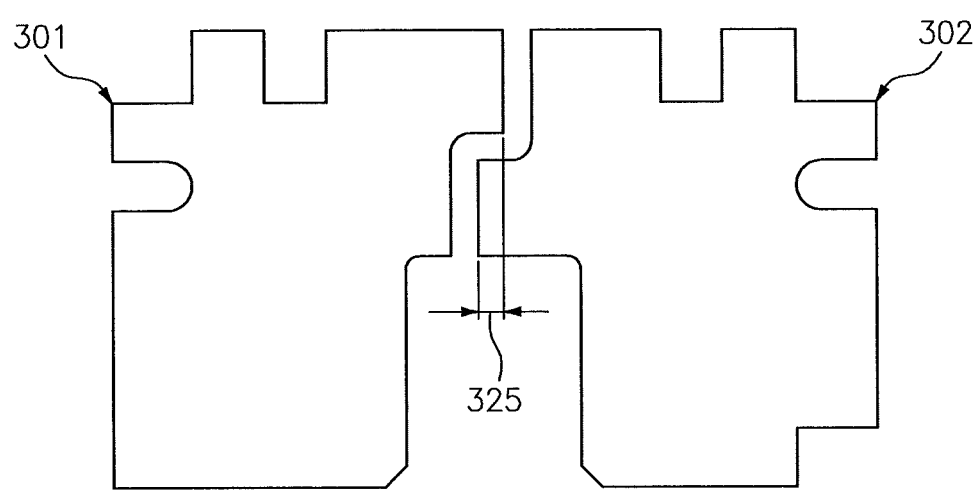
FIGS. 3A-3B illustrate a pair of adjacent seals in accordance with aspects of this disclosure, at minimum and maximum overlap (325), respectively.
Figure 3B:
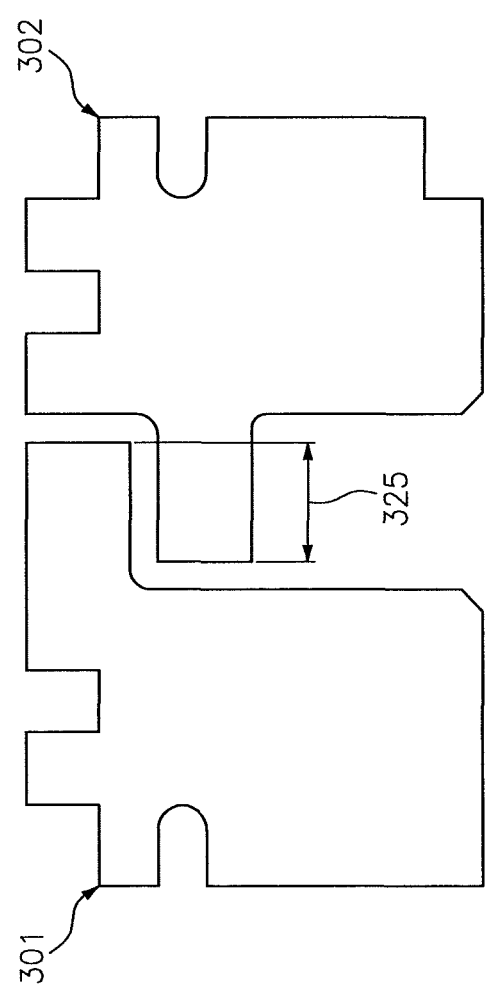
Figure 3C:
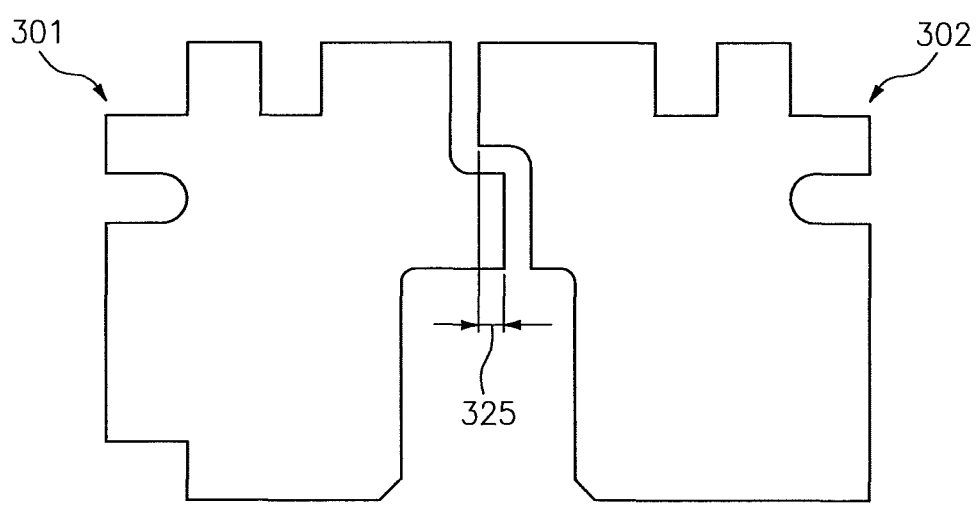
FIGS. 3C-3D illustrate a pair of adjacent seals in accordance with aspects of this disclosure, in an inverted configuration, at minimum and maximum overlap, respectively.
Figure 3D:
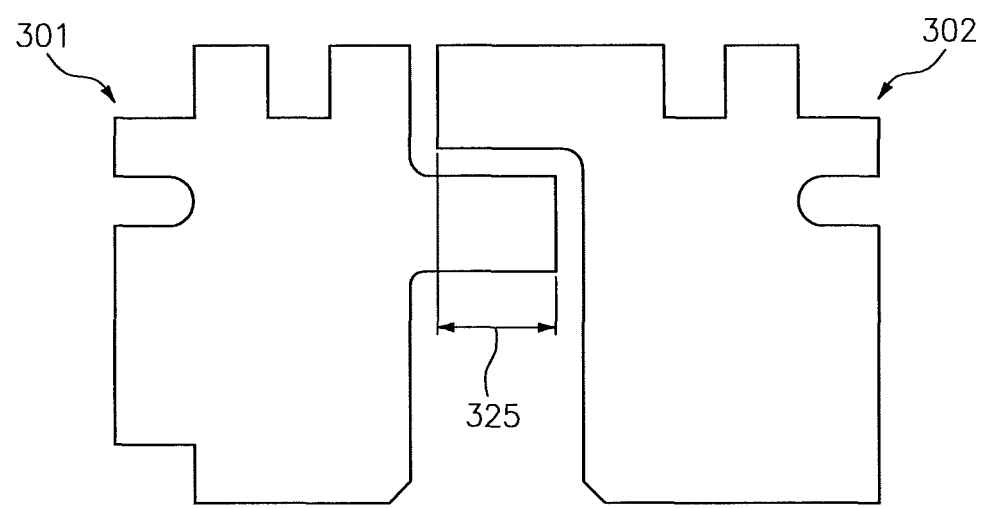

The reference character 325 refers to axial amount of overlap between the seal members 301 and 302, so as to prevent improper assembly. FIG. 3A illustrates a minimum amount of overlap, which may be greater than or equal to the axial gap 324. FIG. 3B illustrates an embodiment of the invention wherein the amount of overlap is at its maximum, this maximum equal to the axial extent of the spring cavity 316 minus twice the axial gap 324. Designs in between these latter two extreme locations are also possible.

Figure 3E:
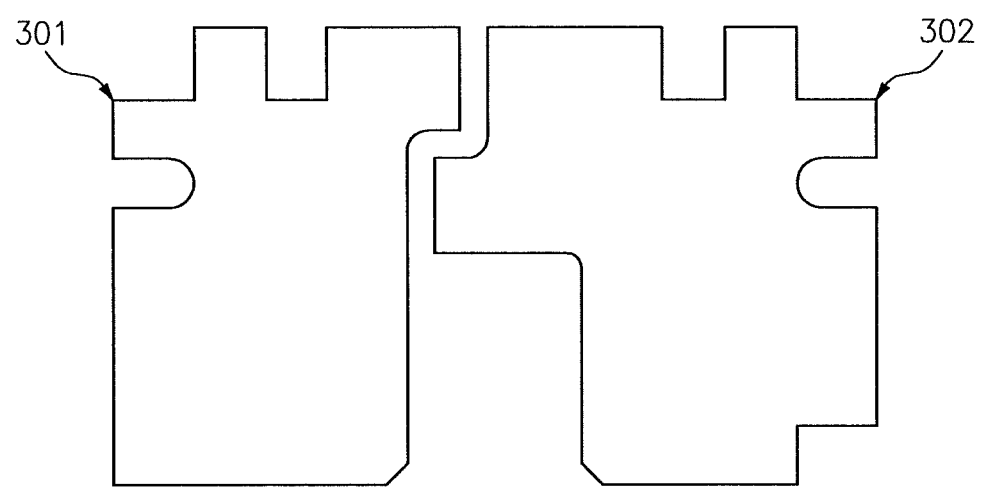
FIGS. 3E-3F illustrate a pair of adjacent seals in accordance with aspects of this disclosure, with gap shifted forward and aft, respectively.
Figure 3F:
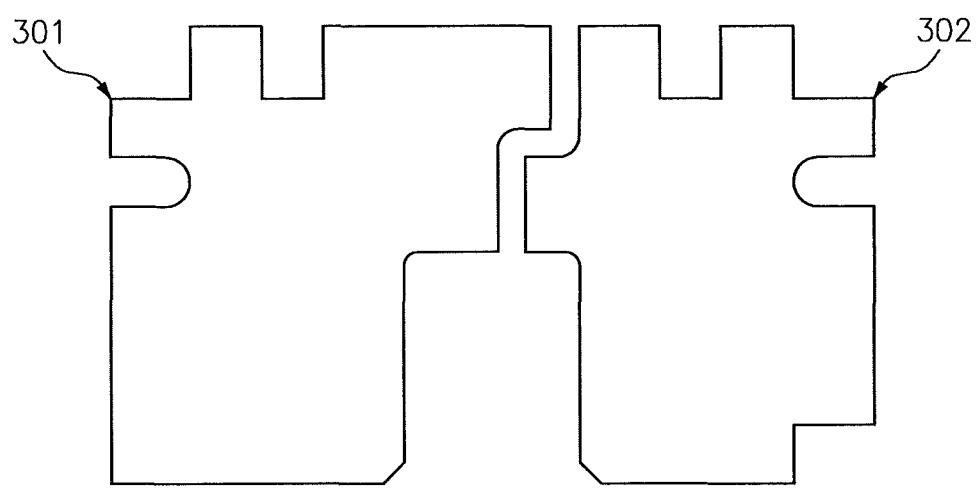

FIG. 3A illustrates the axial gap 324 between the two seal members located approximately at the middle of the spring cavity 316. Two other embodiments of the invention are illustrated by FIGS. 3E-3F, showing axial shifts in the location of this gap. FIG. 3E shows the gap closest to seal element 301, while FIG. 3F shows the gap closest to seal element 302. Designs in between these latter two extreme locations are also possible.

Figure 4A:
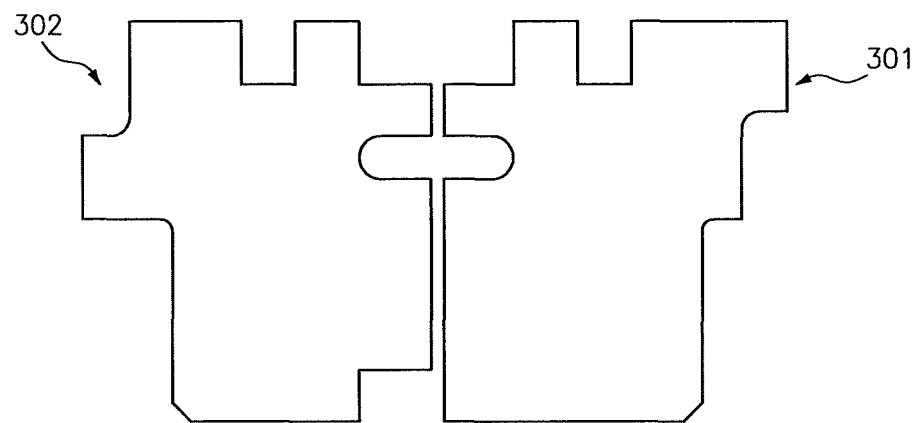
FIGS. 4A-4O illustrate seals of FIG. 3 in various combinations and in various configurations/orientations of assembly.
Figure 4B:
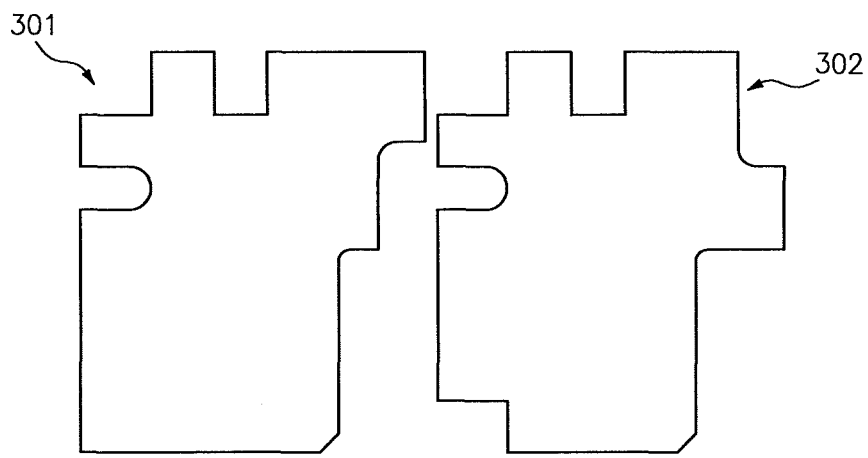
Figure 4C:
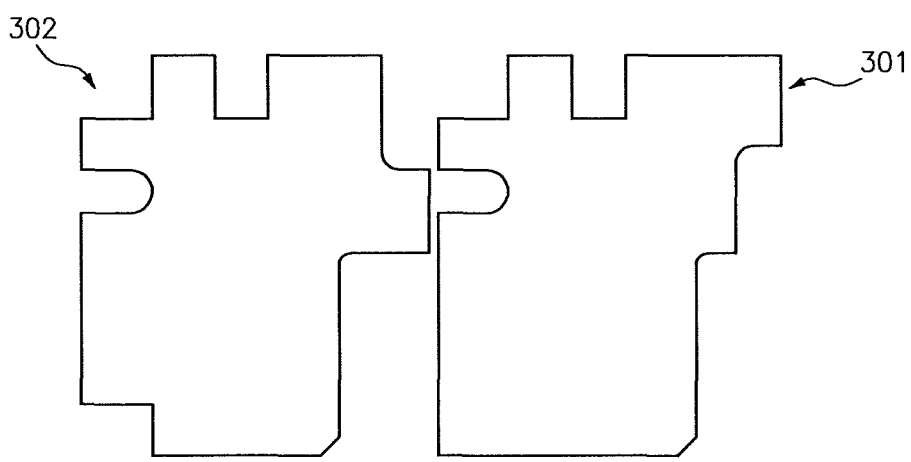
Figure 4D:
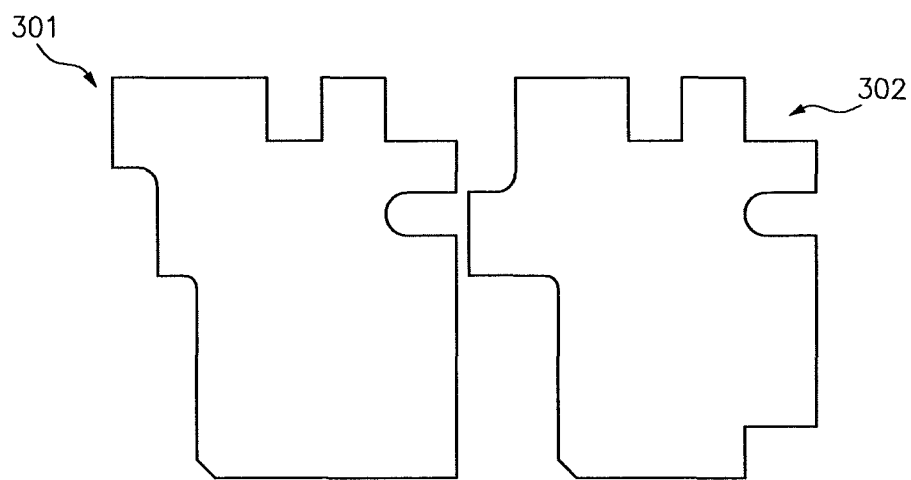
Figure 4E:
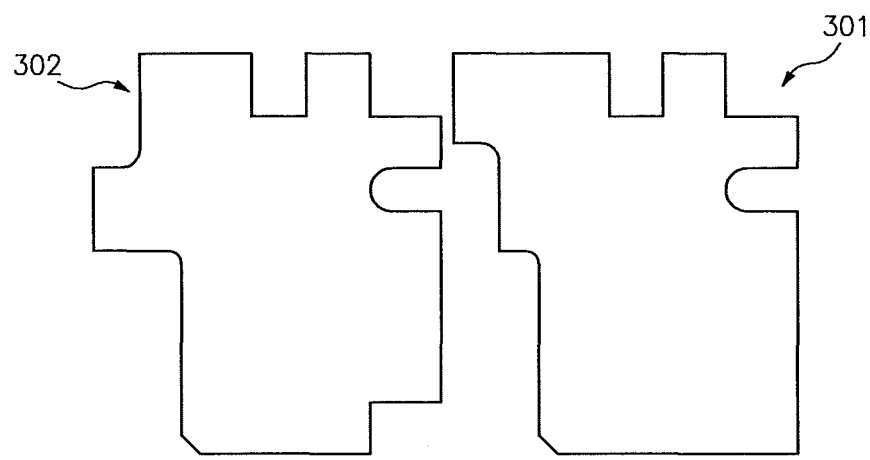
Figure 4F:
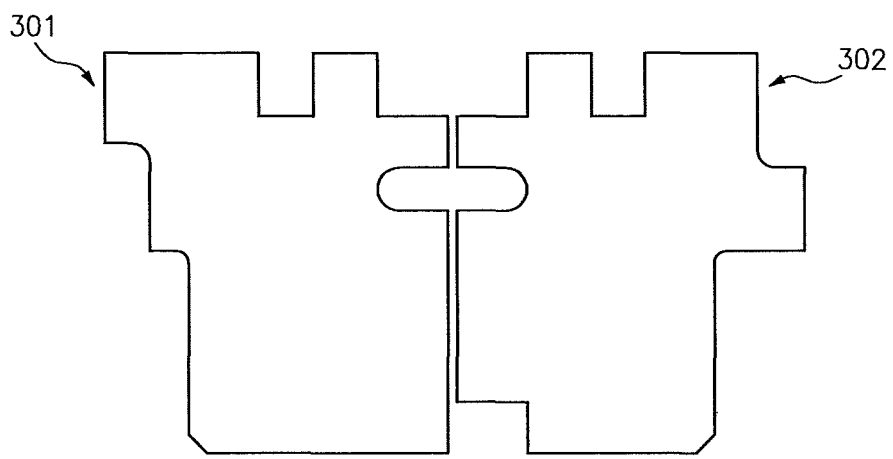
Figure 4G:
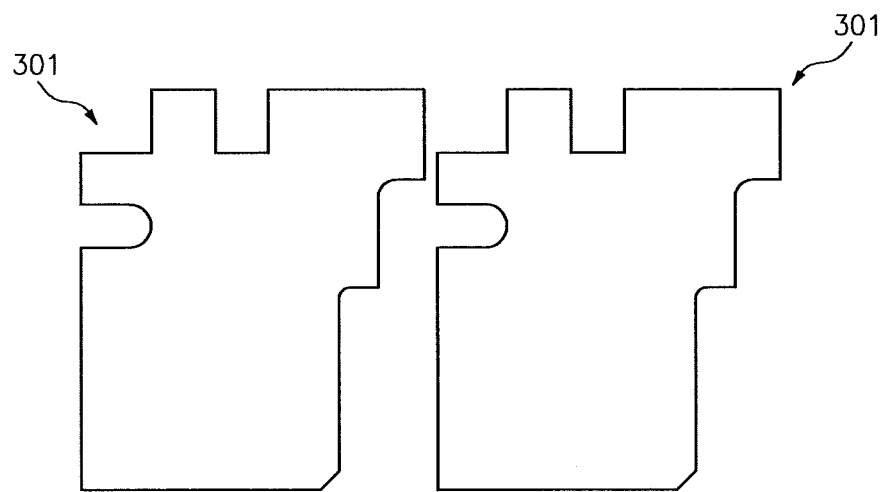
Figure 4H:
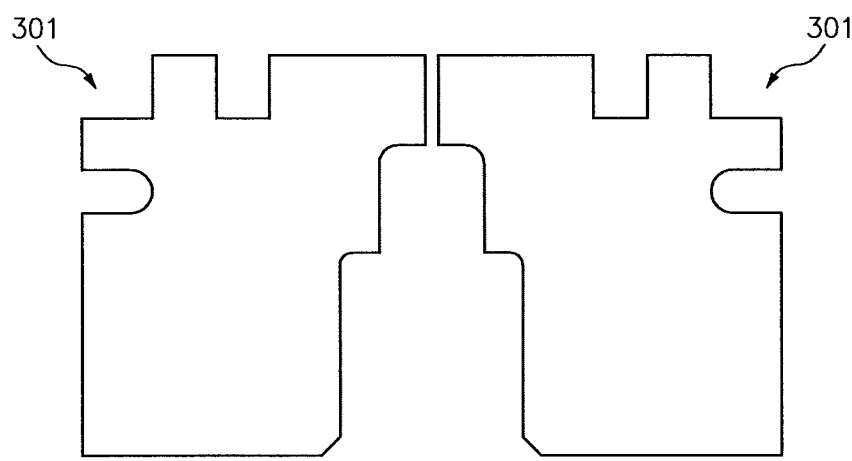
Figure 4I:
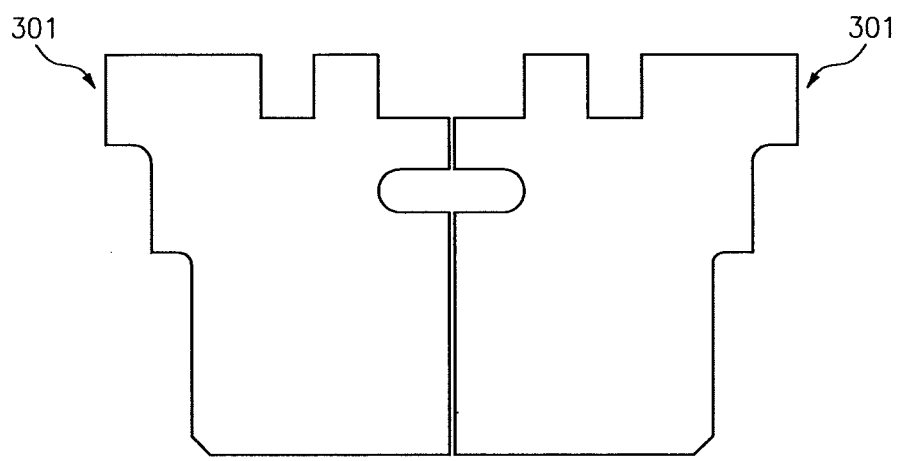
Figure 4J:
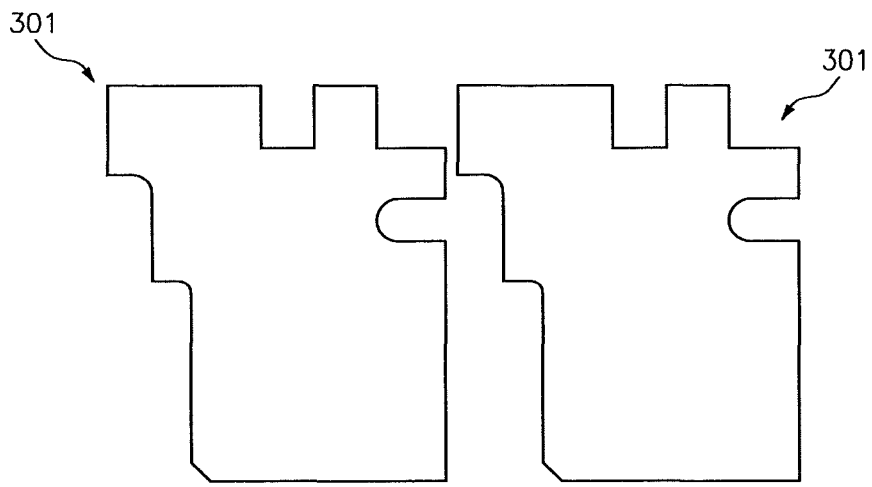
Figure 4K:
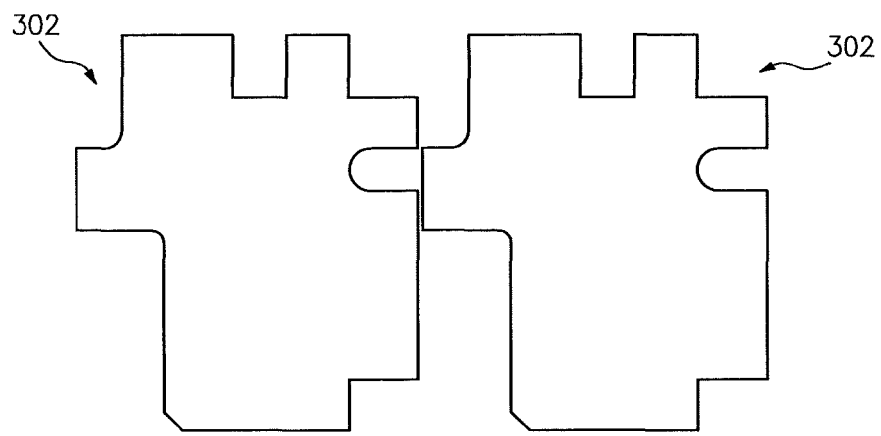
Figure 4L:
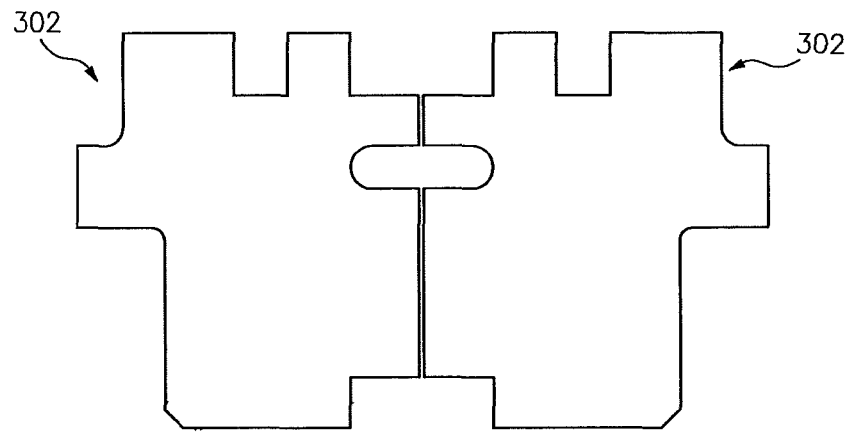
Figure 4M:
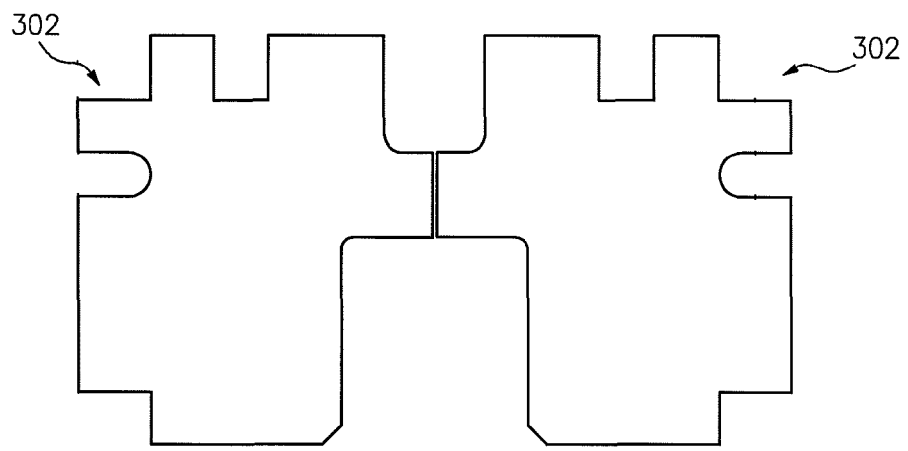

The arrangement/orientation of the seals 301 and 302 as shown in FIG. 3 represents a proper assembly of the seals 301 and 302 with respect to one another. In contrast thereto, FIGS. 4A-4O represent improper assemblies involving combinations of two of the seals 301 and 302. One or more of the features 312-330 described above provide for a foolproof design as described below in connection with FIGS. 4A-4O, such that the improper assemblies will be visible or detectable prior to a full assembly of an engine.

Figure 4N:
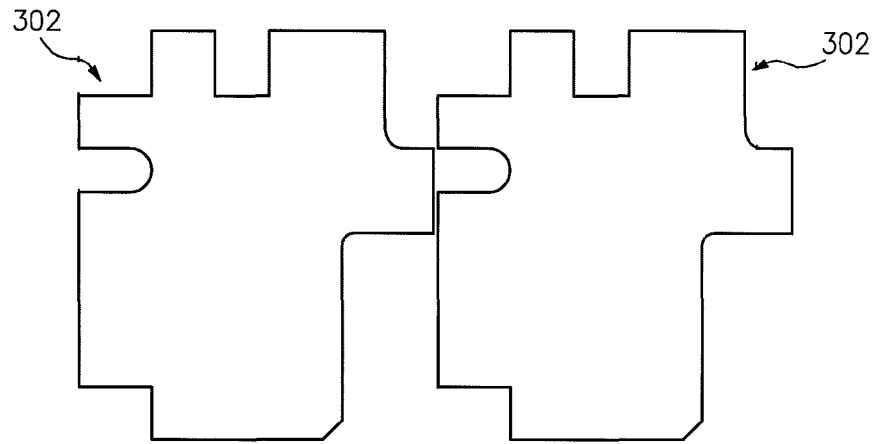
Figure 4O:
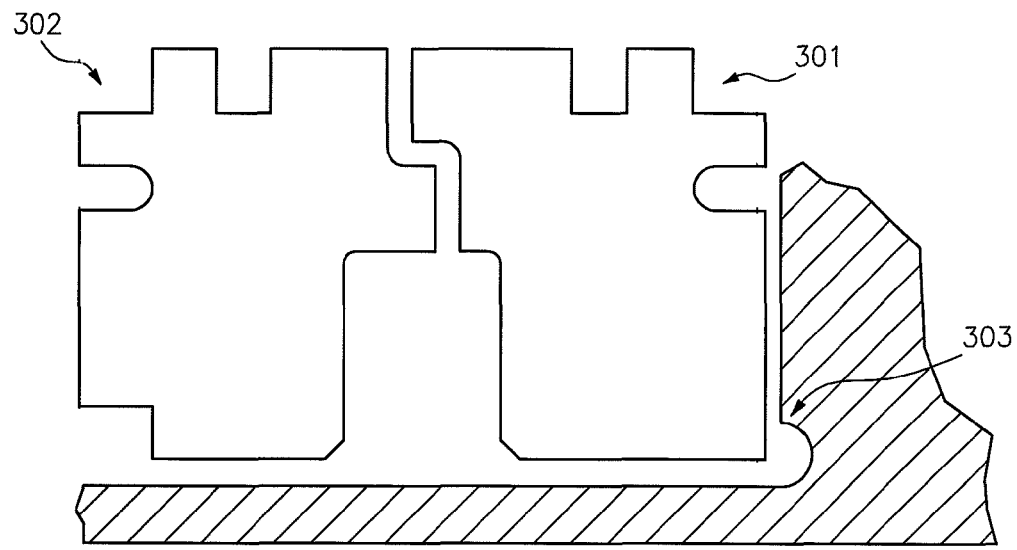

In FIGS. 4A-4N, the improper assembly results in the carbons not fitting.

In FIG. 4H and FIG. 4M, the improper assembly results in the spring losing a detectable amount of compression.

In FIGS. 4A-4G, FIGS. 4I-4L, and FIG. 4N, the improper assembly results in the spring not fitting.

In FIG. 4O, stages (e.g., stages 2, 4, or 6 described above in connection with FIGS. 1A-1B) may experience a detectable amount of wear. The reference character 303 in FIG. 4O refers to a seal plate radius edge near the protruding inside edge of the non-notched seal 301. This location may correspond to the notch 132 and adjoining plate radius edge of FIG. 1A.

Technical effects and benefits of this disclosure include cost and quality metric improvements, seal reliability metric improvements, and an improvement in terms of an engine bearing compartment gapping or physical space/geometry requirements. Such effects/benefits may be applied in an industrial context.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system for a gas turbine engine, comprising:
    a first ring seal that includes a notch and a first radially outer protrusion, the notch being adjacent to an inner diameter sealing face of the first seal with respect to an engine centerline; and
    a second ring seal that includes a second radially outer protrusion,
    wherein the first protrusion and the second protrusion at least partially overlap with one another in an axial direction and a radial direction with respect to the engine centerline to define a curved tortuous flow path between the first seal and the second seal,
    wherein the second seal is immediately axially adjacent to the first seal,
    wherein the second seal is notch-free adjacent to an inner diameter sealing face of the second seal at an axially forward end of the second seal, and
    wherein the second seal is located axially forward of the first seal, and wherein the notch is located at an axially aft end of the first seal.

2. The system of claim 1, wherein the first seal and the second seal provide a radial gap that accommodates a movement of the first seal and the second seal.

3. The system of claim 1, wherein the first seal and the second seal provide respective radii.

4. The system of claim 1, wherein the first seal and the second seal are bound by a first seal plate and a second seal plate, respectively.

5. The system of claim 1, further comprising:
    a bearing compartment coupled to the first seal and the second seal.

6. The system of claim 4, wherein the first protrusion and the second protrusion are configured such that when one of the first seal or the second seal is placed in an improper location relative to a respective predetermined location a resulting assembly including the first seal and the second seal will require more axial space than is available between the plates.

7. The system of claim 1, wherein the first seal and the second seal are arranged to provide a radial gap between the first protrusion and the second protrusion that accommodates a movement of the first seal and the second seal.

8. The system of claim 1, wherein the first seal includes a second notch at an outer diameter of the first seal, and wherein the second seal includes a third notch at an outer diameter of the second seal.

9. The system of claim 1, wherein the first and second protrusions each define a curved portion that includes segments that are parallel to a central axis of the first seal.

10. The system of claim 1, wherein the first protrusion is located a first radial distance from the engine centerline and the second protrusion is located a second radial distance from the engine centerline, and wherein the first radial distance is less than the second radial distance.

11. The system of claim 1, further comprising:
    a liner located radially outward of the first seal and the second seal with respect to the engine centerline, the first seal and the second seal at least partially bound by and engaged to the liner.

12. The system of claim 11, further comprising:
    a first plate that at least partially bounds the first seal on an axially aft facing surface of the first seal; and
    a second plate that at least partially bounds the second seal on an axially forward facing surface of the second seal.

13. The system of claim 1, further comprising:
    a third ring seal that includes a second notch and a third protrusion, the second notch being adjacent to an inner diameter sealing face of the third seal with respect to the engine centerline; and
    a fourth ring seal that includes a fourth protrusion,
    wherein the third protrusion and the fourth protrusion at least partially overlap with one another in the axial direction and the radial direction with respect to the engine centerline to define a second tortuous flow path between the third seal and the fourth seal,
    wherein the fourth seal is immediately axially adjacent to the third seal,
    wherein the fourth seal is notch-free adjacent to an inner diameter sealing face of the fourth seal at an axially forward end of the fourth seal,
    wherein the fourth seal is located axially forward of the third seal, and
    wherein the second notch is located at an axially aft end of the third seal.

* * * * *